United States Patent
Wu

(10) Patent No.: US 6,357,269 B1
(45) Date of Patent: Mar. 19, 2002

(54) STEERING LOCK

(76) Inventor: Hao Wu, Jinhou Village, Tingtian Town, Ruian City, Zhejiang Province (CN)

(*) Notice: Subject to any disclaimer, the term of this patent is extended or adjusted under 35 U.S.C. 154(b) by 0 days.

(21) Appl. No.: 09/538,259

(22) Filed: Mar. 30, 2000

(30) Foreign Application Priority Data

Jul. 2, 1999 (CN) ........................... 99 2 14557 U
Mar. 15, 2000 (CN) ........................... 00 1 03481 A

(51) Int. Cl.⁷ ............................................. E05B 25/02
(52) U.S. Cl. ................................. 70/209; 70/417
(58) Field of Search ........................... 70/209, 211, 238, 70/417

(56) References Cited

U.S. PATENT DOCUMENTS

| | | | | |
|---|---|---|---|---|
| 5,055,823 A | * | 10/1991 | Fuller | 70/209 X |
| 5,097,685 A | * | 3/1992 | Lien | 70/209 |
| 5,400,627 A | * | 3/1995 | Liao | 70/209 |
| 5,426,960 A | * | 6/1995 | Jan | 70/209 |
| 5,440,908 A | * | 8/1995 | Lin | 70/209 |
| 5,454,242 A | * | 10/1995 | Su | 70/209 |
| 5,457,972 A | * | 10/1995 | Lo | 70/209 |
| 5,609,050 A | * | 3/1997 | Yu | 70/209 |
| 5,671,619 A | * | 9/1997 | Hou | 70/209 |
| 5,676,000 A | * | 10/1997 | Chen | 70/209 |
| 5,718,133 A | * | 2/1998 | Chen et al. | 70/209 |
| 5,802,896 A | * | 9/1998 | Tsai | 70/417 |
| 5,921,120 A | * | 7/1999 | Wu | 70/209 |

* cited by examiner

Primary Examiner—Lloyd A. Gall
(74) Attorney, Agent, or Firm—Alston & Bird LLP

(57) ABSTRACT

A steering lock with a cross shape consists of a base consists of a blocking rod, a lock body, and a clipping element, the base has arched cases stretching out to both wings, and inside of which is a U-shaped gripping recess for covering the wheel handle. The clipping element extends transversely over the recess and rotates around the pivot. On the cylindrical surface of the clipping element there is a keyhole engaged by the lock pin for the lock. Bearers of different size may be fixed on the flat region of the clipping element to adapt to wheel handles of different thickness. The advantages of the present invention lies in simplified structure, low cost, reliable lock and easily adaptation to steering wheels of different size.

7 Claims, 5 Drawing Sheets

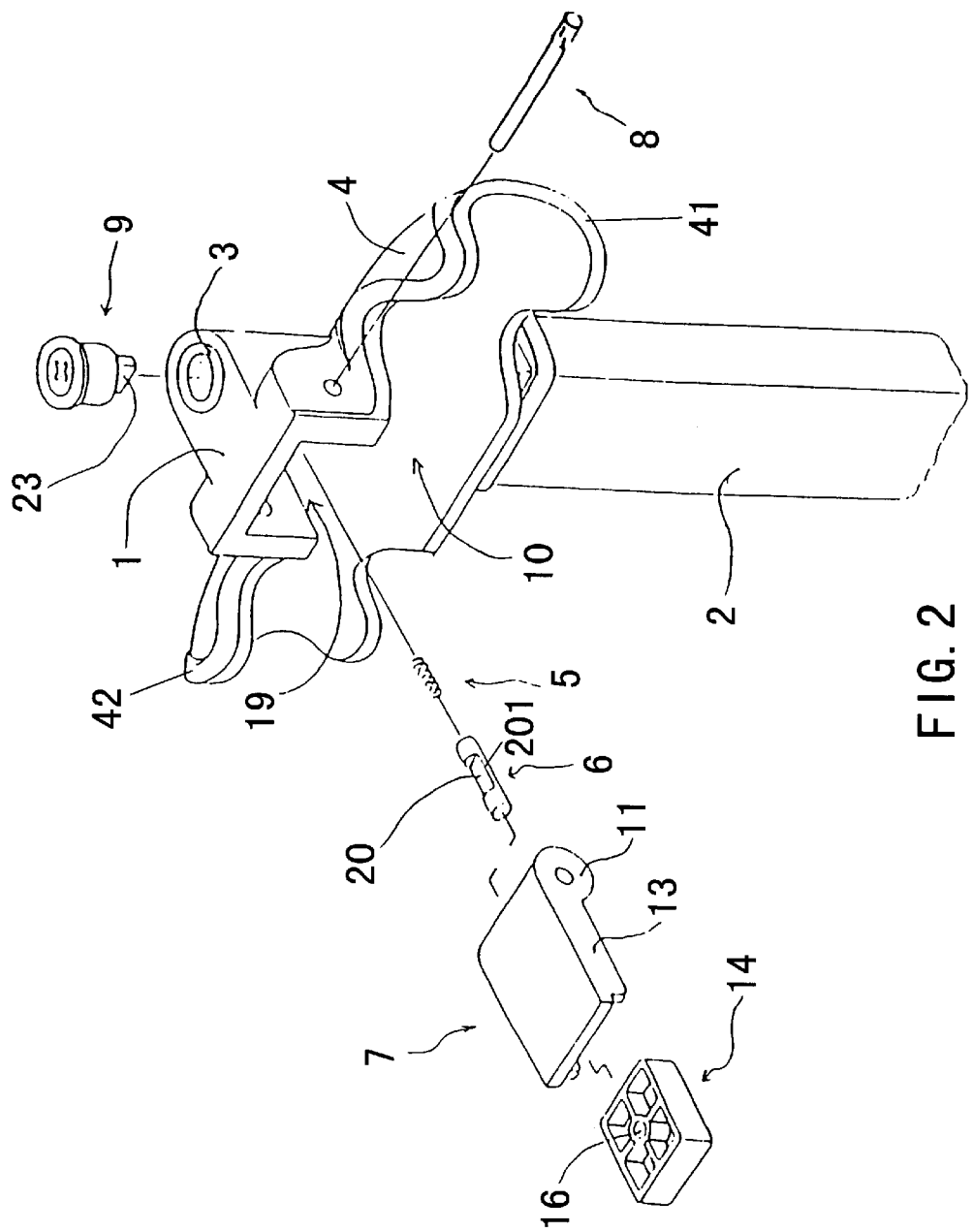
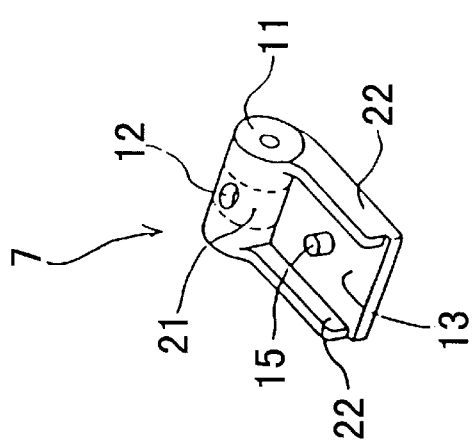

STEERING LOCK

BACKGROUND OF THE INVENTION

The present invention relates to steering locks and relates more particularly to such an automobile steering lock which is mounted on the steering wheel of an automobile to limit degree of its spinning freedom.

Various types of steering locks for vehicles, for example, automobiles, have been disclosed; however, most of them have the drawbacks of a complicated structure and a high manufacture cost. For example, such drawbacks can be found in the patents of U.S. Pat. No. 5,718,133 and U.S. Pat. No. 5,671,619. FIG. 6 shows the structural design of the cited patent of U.S. Pat. No. 5,718,133. The clipping element 3 is a pivoting piece that can engage the steering wheel and an auxiliary block 4 is mounted on it to grip steering wheels of different size. The whole mechanism consists of a screw 41, an elastic element 42, and a sliding block 4, and an additional recess is required on the inside of the rotary piece 3 to allow the displacement of the sliding block, thus complicating the entire structure of the device. FIG. 7 is the FIG. 5 of the cited patent of U.S. Pat. No. 5,671,619 showing the detailed structure of a similar steering lock, which in general consists of three parts, namely, two coupling hemispherical casings 1, a clamping plate 2 and a partition plate 16. Thus, it is complicated in structure and costly.

SUMMARY OF THE INVENTION

An object of the present invention is to provide a more reliable and less expensive steering lock with the simplest possible structure and the lowest possible cost, which can be applied to steering wheels of different thickness.

According to one aspect of the present invention, it provides a kind of lock that can lock up the steering wheels of vehicles. It resembles a cross in general, and consists of a base with a lock body, the base has arched cases stretching out to both wings, and the arched case in arched shape has a U-shaped gripping recess for engagement with a portion of the steering wheel of the vehicle, while its radian being in conformity with that of the steering wheel being locked. On the outer end of the base is seated a lock body, whose keyhole is visible on the front surface. On the other end of the base opposite to the lock is an outward extending blocking rod which is set on the top of the dashboard of a vehicle. The present invention characterizes in that there is a rotary clipping element that extends transversely over the U-shaped recess for the purpose of locking on the base. The clipping element comprises two parts, in which the main body is in the shape of a plate and the column part at the end closing the pivot substantially takes the form of a cylinder. The pivot runs through the central hole of the cylinder. On the arc cylindrical surface of the cylinder there is a recessed keyhole, which locks the clipping element cooperating with the lock pin in the lock body. On the inside of the flat region of the clipping element is a bearer, which is fixed on the flat region of the lock by means of the fixture on the flat region of the clipping element. The bearer fixture can be a short protruding convex cylinder of the shape of a column roughly at the center of the flat region, while substantially at the center of the bearer there is a corresponding hole. They are removably jointed in the manner of shrink fit. The bearer may be hard as well as soft and it may be in the shape of a square.

The advantages of the present invention lies in that the general structure of the apparatus is greatly simplified and the cost is considerably reduced because one of the two hemispherical cases of the main body of the conventional steering lock is replaced with a flat-type clipping element. Because most part of the lock according to the present invention is made of aluminum alloy, the lock is light yet its strength and resistance against pick remain. The present invention can also be applied to steering wheels of different size.

Below is a detailed description of the present invention with reference to the preferred embodiments and the attached drawings.

BRIEF DESCRIPTION OF THE DRAWINGS

FIG. 2 is an exploded view of the steering lock according to the present invention.

FIG. 5 is a perspective view of the clipping element (made of steel and aluminum) of the steering lock according to the present invention.

DETAILED DESCRIPTION OF THE PREFERRED EMBODIMENT

Figure 1:
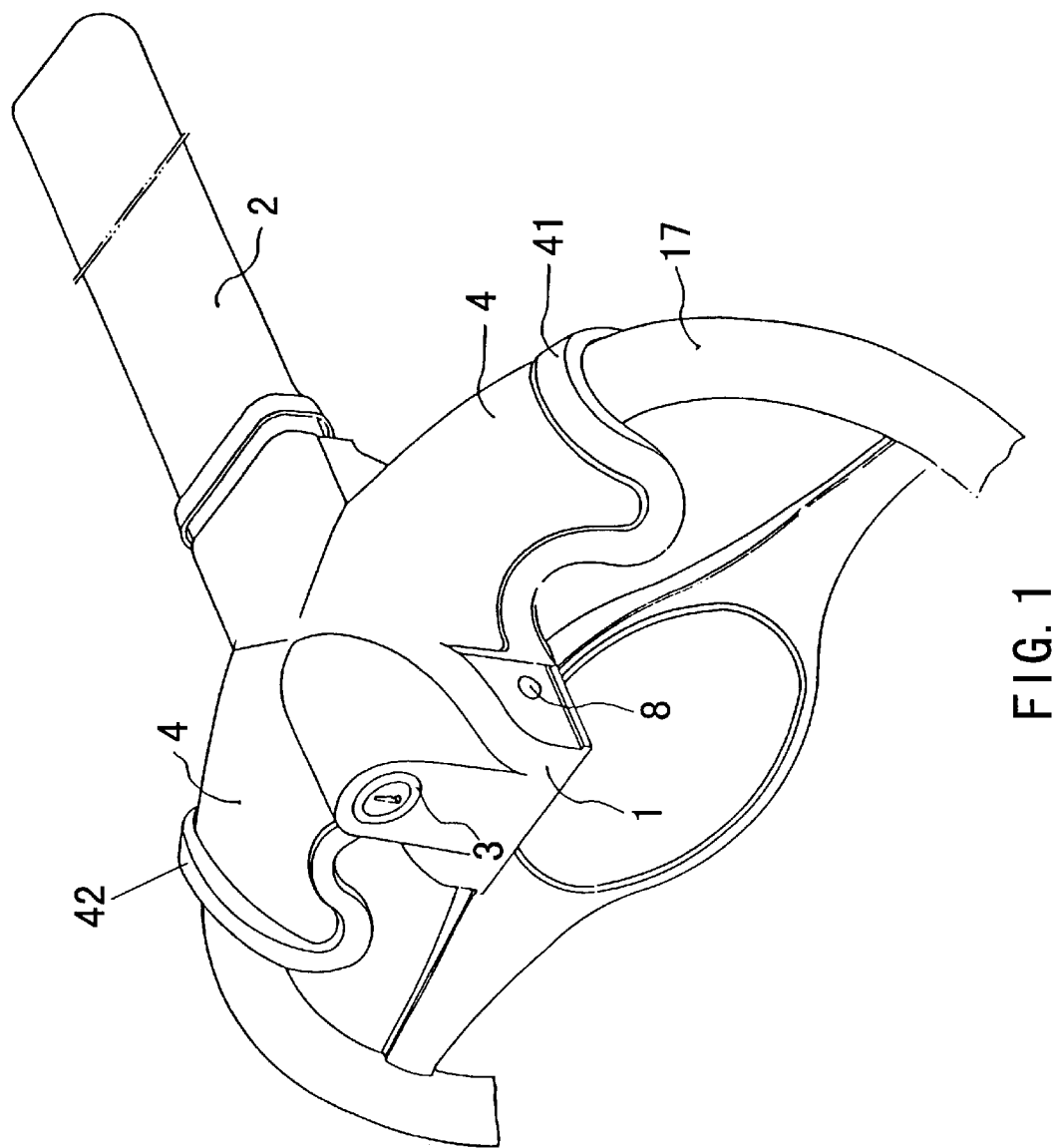
FIG. 1 is a view showing the appearance of a steering lock according to the present invention installed in a motor vehicle.

With reference to FIG. 1, the auto steering lock of a vehicle according to the present invention resembles in general a cross. When it is covering on the steering wheel of a vehicle and being locked, the extending blocking rod (2) is placed on the surface of the dashboard of the vehicle, thereby confining the rotation of the steering wheel of the vehicle in general. The hard blocking rod (2) can be embraced by a soft casing.

Its detailed structure is much apparent referring to FIG. 2. A lock body (3) is mounted on the base (1) while the keyhole is located on its front surface. On the other end of the base (opposite to the lock body) is a square hole for the insertion and fixation of the locking rod (2). The blocking rod (2) is integrated with the base upon insertion in it. On the base (1) there is an arched case (4) extending to the two wings (41,42). The arched case (4) bears a U-shaped gripping recess (10) to hold the wheel handle (17) of the vehicle. The arching radiant of the arched case (4) is substantially in conformity with that of the steering wheel. In the installation, the integrated structure of the base (1) and the arched case (4) covers the wheel handle (17) downwards, then the clipping element (7) is upwardly rotated to cover the wheel handle (17) and it is in a locked position. In the base (1) below the lock (3) there is a cavity (19) to accommodate the clipping element (7). A pivot (8) that is used to assemble the flat-type clipping element (7) is horizontally installed in the cavity (19). It runs through the central hole of the cylinder (11) at the bigger end of the clipping element, thus fixing the entire clipping element (7) to the base. On the cylindrical surface of the cylinder body of the clipping element (7) is a keyhole (12), which is engaged by the lock pin (6) and forms a locking relationship with the same. As seen from FIG. 3 and FIG. 4, the lock pin (6) is a cylinder, and on the central surface of which is a poked recess (20) with a flat bottom (201) which cooperates with the lock core (9) located at the tip and the poked recess (20) can be moved by turning the lock core(9). The front end of the lock core (9) is a cylinder segment (23) which has a cross section of an incomplete circle. At the end of the lock pin (6) is a spring (5). When the spring (5) is in a free state, the lock pin (6) protrudes forward and its head inserts into the keyhole (12), thus achieving the lock of the clipping element. Meanwhile, the incomplete circle at the front tip of the lock core (9) is thereby occupied by the lock pin (6) (referring to FIG. 3). In order to unlock, we have to insert the key into the keyhole and turn the lock core (9), then the lock pin (6) is moved to overcome the pressure of the spring and withdraws, thus the head of the lock pin (6) is separated from the keyhole (12), and then the clipping element (7) is released. The entire lock can then be removed from the wheel handle (17) (referring to FIG. 4).

The wheel handle (17) of the steering wheel of vehicles varies in diameter, and falls into several specifications. In order to adapt to steering wheels of different diameters, the lock according to the present invention has a soft square bearer (14) fixed on the inner side of the flat region of the clipping element (7) so as to adjust the fitting of different sizes. On one lateral surface of the bearer (14) there is a round hole (16), while on the surface of the flat region (13) of the clipping element (7) there is a short protruding cylinder (15) of the shape of a column, while they cooperate to fix the bearer (14) to the clipping element (7). A lateral frame (22) is located in the flat region to fix the bearer (14). By changing the bearers (14) of various thickness, the lock can be applied to wheel handles (17) of different size.

In order to reduce the weight of the whole lock, the body of the lock can be made with light materials such as aluminum alloy. However, the mechanical intensity of aluminum alloy is not high enough so that a special design and process are adopted in the present invention as regards the clipping element (7), that is, a high-intensity steel cylindrical segment (21) is inserted into the center region of the cylindrical portion (11) of the clipping element (7), with a keyhole (12) on the top of it (referring to FIG. 5). Such layout can highly increase the lock's strength to resist to the pick of the lock, because when a thief destroys the lock, he is bound to pry the clipping element (7) off the lock, that is to say, he must destroy the locking engagement between the tip of the lock pin (6) and the keyhole (12). If the entire body of the clipping element is made of aluminum alloy, its intensity will be reduced so that it is easy to pry the clipping element (7) off the lock.

Figure 4:
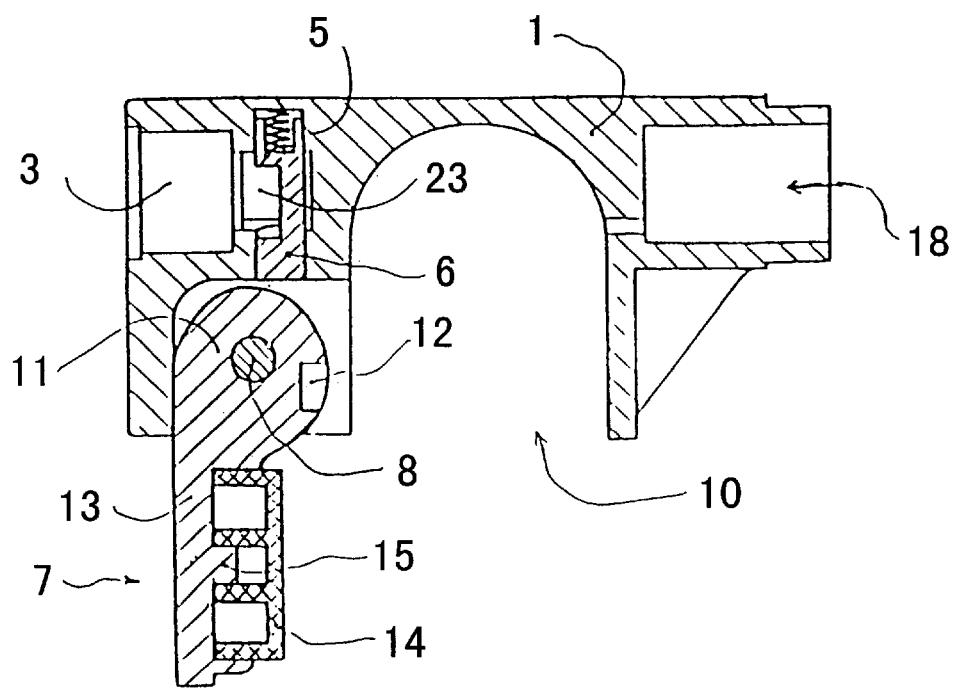
FIG. 4 is a sectional view of the steering lock according to the present invention showing the unlocked states of the clipping element.
Figure 3:
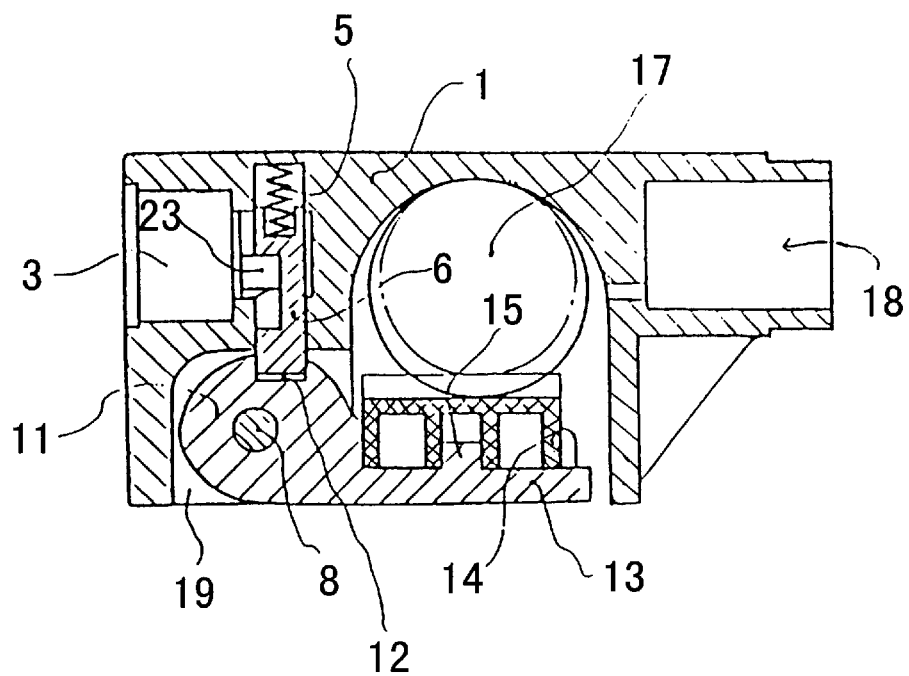
FIG. 3 is a sectional view of the steering lock according to the present invention showing the locked state of the clipping element.
Figure 6:
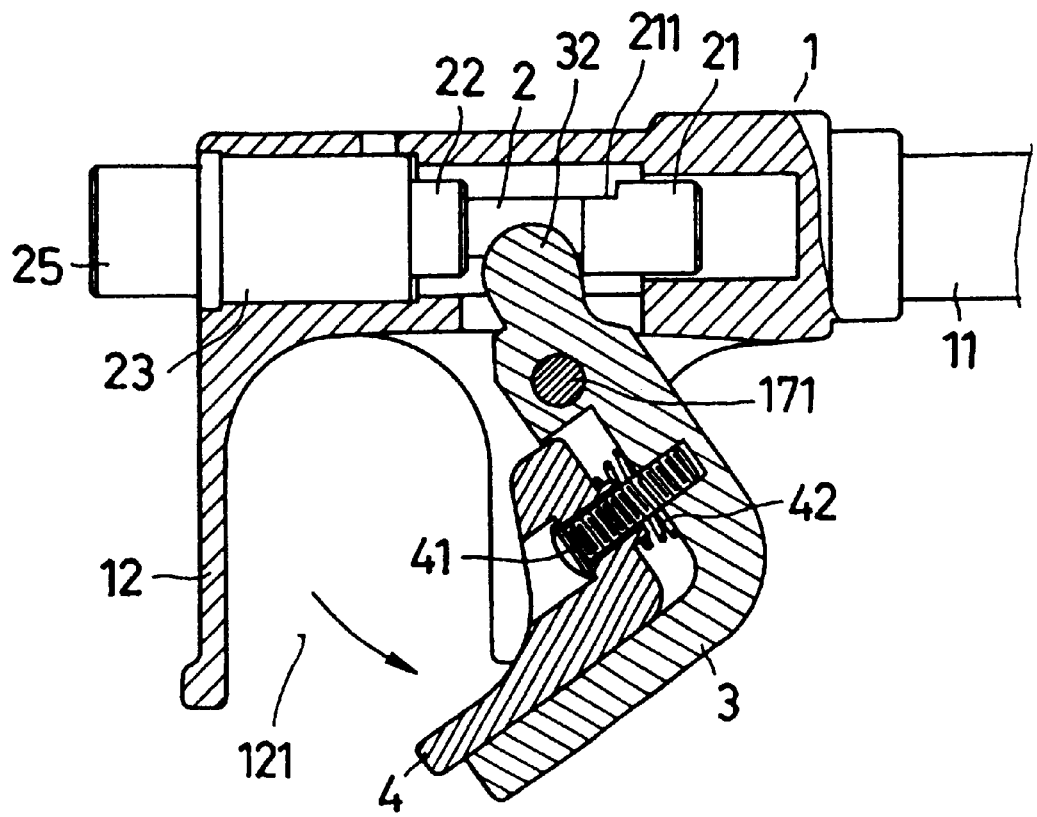
FIG. 6 is the FIG. 2 of the cited patent U.S. Pat. No. 5,718,133 (Prior Art).
Figure 7:
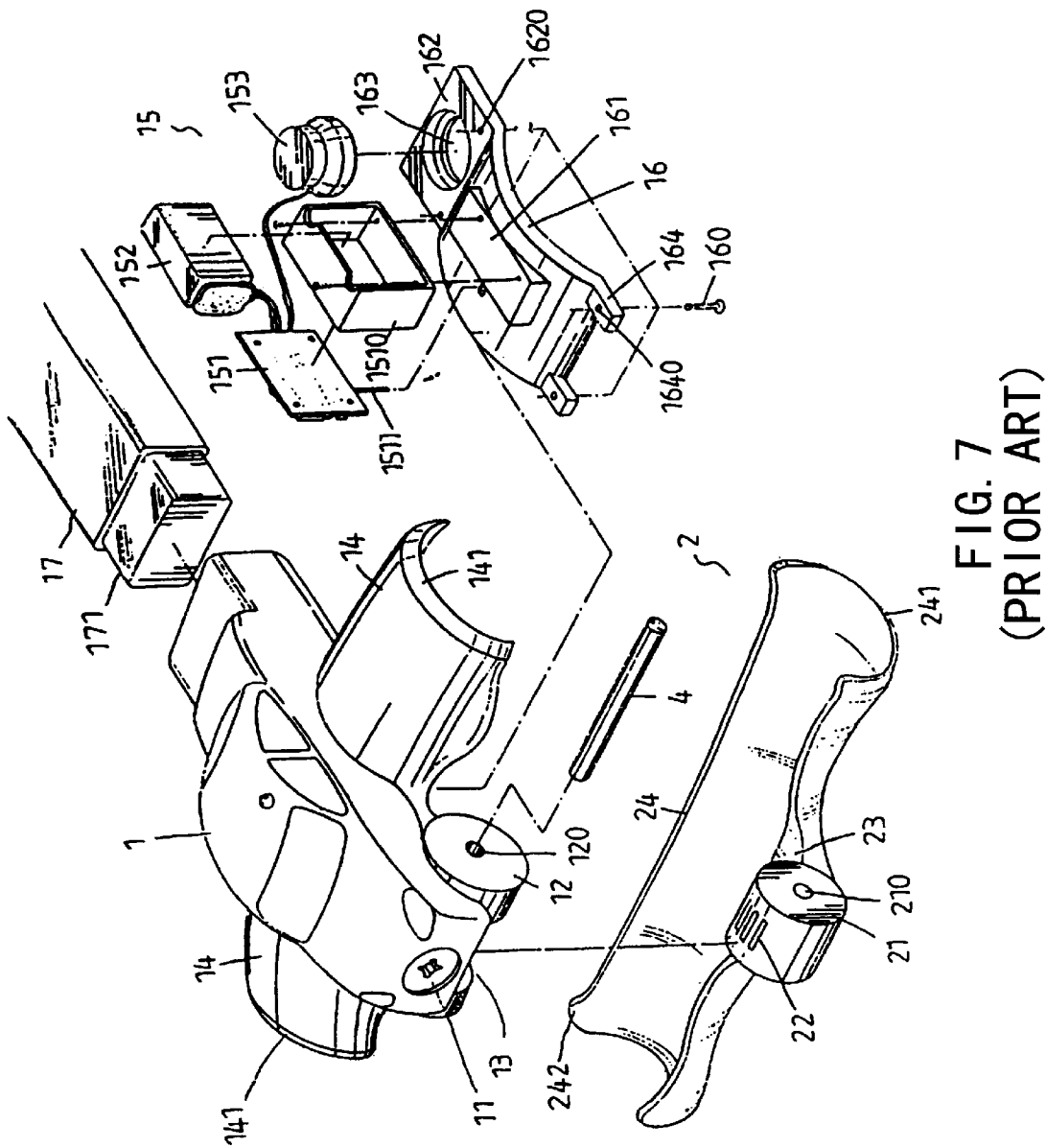
FIG. 7 is an exploded view (FIG. 5) of the cited patent U.S. Pat. No. 5,671,619 (Prior Art).

We can identify from FIG. 3 and FIG. 4 the two different states when the lock is unlocked and locked. FIG. 3 also shows the adaptation of the lock to wheel handles (17) of different diameter. The solid lines denote the situation wherein thin bearers (14) are used in order to adapt the lock to thick wheel handle, whereas the dotted lines display the case when thick bearers (14) are used in order to adapt the lock to a thin wheel handle (17).

What is claimed is:

1. A steering lock, which resembles a cross in general, comprising a base with a lock body, said base having an arched case stretching out to both wings, and the said arched case in arched shape having a U-shaped gripping recess inside for engagement with part of a steering wheel of a vehicle, on the outer end of the base being seated a lock body, and on the end of the base opposite to the lock body being an outward extending blocking rod, is characterized in that:

A) there is a rotary clipping element that extends transversely over the said U-shaped recess on the base, and the main body of which is in the shape of a flat plate and an end enclosing a pivot substantially takes the form of a bigger cylinder;

said pivot runs through the central hole of the said cylinder; on the arc cylindrical surface of the said cylinder there is a recessed keyhole, which locks the clipping element cooperating with the lock pin of the lock body;

there is a high-intensity steel cylindrical segment at the center region of the cylinder of the clipping element, B) the radian of the said arched case with a U-shaped gripping recess is in conformity with that of the steering wheel.

2. The steering lock according to claim 1 is characterized in that, on the inside of the flat plate is a fixture for a bearer.

3. The steering lock according to claim 2 is characterized in that, the said fixture for the bearer has a short protruding cylinder of the shape of a column substantially at the center of the flat plate.

4. The steering lock according to claim 1 is characterized in that, a lateral frame is located on the flat plate of the said clipping element to fix a bearer.

5. The steering lock according to claim 3 is characterized in that, a square bearer can be fixed on the flat plate of the clipping element, and the said square bearer has a round hole at its substantial center forming tight connection with the said short protruding cylinder.

6. The steering lock according to claim 5 is characterized in that, the said bearer can be made of soft materials with different thickness.

7. The steering lock according to claim 1 is characterized in that, the surface of the said blocking rod is soft.

* * * * *